(12) United States Patent
Malaran et al.

(10) Patent No.: US 12,071,136 B2
(45) Date of Patent: Aug. 27, 2024

(54) NAVIGATING MINOR-MAJOR INTERSECTIONS WITH AN AUTONOMOUS VEHICLE

(71) Applicant: GM CRUISE HOLDINGS LLC, San Francisco, CA (US)

(72) Inventors: Adrian Kit Malaran, San Francisco, CA (US); Jeremy Allan, Menlo Park, CA (US); Abhishek Jain, Alameda, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 183 days.

(21) Appl. No.: 17/723,006

(22) Filed: Apr. 18, 2022

(65) Prior Publication Data
US 2023/0331230 A1    Oct. 19, 2023

(51) Int. Cl.
  *B60W 30/18*    (2012.01)
  *B60W 60/00*    (2020.01)

(52) U.S. Cl.
  CPC .. *B60W 30/18159* (2020.02); *B60W 60/0027* (2020.02); *B60W 2552/05* (2020.02); *B60W 2555/60* (2020.02)

(58) Field of Classification Search
  CPC ....... B60W 30/18159; B60W 60/0027; B60W 60/0017; B60W 60/00274
  See application file for complete search history.

(56) References Cited

U.S. PATENT DOCUMENTS

| 2019/0384309 A1 | 12/2019 | Silva et al. |
| 2020/0225669 A1 | 7/2020 | Silva et al. |
| 2020/0394911 A1* | 12/2020 | Harmel ................ G05D 1/0287 |
| 2021/0016780 A1 | 1/2021 | Allan et al. |
| 2021/0061269 A1* | 3/2021 | Petroff ............ B60W 30/18159 |
| 2021/0300412 A1* | 9/2021 | Dingli ............... B60W 50/0098 |
| 2021/0403050 A1* | 12/2021 | Gan ................. B60W 60/0027 |
| 2022/0340138 A1* | 10/2022 | Seegmiller .......... B60W 30/045 |
| 2022/0382279 A1* | 12/2022 | Wray ................... G05D 1/0088 |

FOREIGN PATENT DOCUMENTS

WO    2023204925    10/2023

OTHER PUBLICATIONS

International Search Report and Written Opinion for PCT/US23/15937, mailing date of Jun. 29, 2023, 9 pages.

* cited by examiner

*Primary Examiner* — Adam R Mott
*Assistant Examiner* — Matthew C Gammon (57) ABSTRACT

Approaches to managing navigation of autonomous vehicles through minor-major intersections are disclosed. A minor-major intersection is detected. Shadow tracks are generated for occlusions associated with the minor-major intersection. A maneuver evaluation is performed based on induced kinematic discomfort and post-encroachment time. Preliminary lateral and longitudinal planning is performed based on shadow tracks, induced kinematic discomfort and post-encroachment time to generate one or more proposed trajectories. Final trajectory generation is performed by refining at least one of the one or more proposed trajectories to generate the final trajectory. The autonomous vehicle performs a selected maneuver corresponding to the final trajectory within the minor-major intersection.

20 Claims, 6 Drawing Sheets

NAVIGATING MINOR-MAJOR INTERSECTIONS WITH AN AUTONOMOUS VEHICLE

TECHNICAL FIELD

Examples provided herein relate to techniques and mechanisms to control operation of an autonomous vehicle while operating within a minor-major intersection. More particularly, examples provided herein relate to techniques and mechanisms to control operation of the autonomous vehicle from a controlled minor lane to a major lane through an intersection where other road users may be accessing the intersection.

BACKGROUND

Autonomous vehicles, also known as self-driving cars, driverless vehicles, and robotic vehicles, may be vehicles that use multiple sensors to sense the environment and move without human input. Automation technology in autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, and traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Many examples provided herein are described in terms of minor-major intersection maneuvers. A minor-major intersection is an intersection where a vehicle (e.g., an autonomous vehicle) entrance into the intersection is controlled by a stop sign or by a yield sign, and the cross traffic lanes do not stop (e.g., do not have a traffic control mechanism that requires a stop at the intersection). The lane with the stop sign or yield sign is considered the minor and the cross-traffic lanes that do not stop and have the right of way are considered the major. Minor-major maneuvers can be considered unprotected because the traffic on the minor road must yield to the traffic on the major road.

There are various types of minor-major maneuvers that can be differentiated by on or more characteristics including, for example, turn type, traffic sign type, speed limit of outgoing lane, number of outgoing lanes with same turn direction, road topology and sidewalk crossing. Additional and/or different characteristics can be utilized.

In general, turn type refers to the intersection lane that can allow left turns, right turns and/or proceeding straight through the intersection. Left turns and straights have yield-to lanes coming from opposite directions. On left turn and right turn maneuvers, the autonomous vehicle will merge with traffic, while on straights, the autonomous vehicle must cross through cross traffic safely, but does not merge with traffic. In all cases, the autonomous vehicle is in contention with traffic on all corresponding yield-to lanes. There can be a left turn onto a one-way road that can have equivalent yielding requirements as a right turn.

The sign types associated with minor-major intersections are stop, yield and unmarked yield (although other signs may be possible). Stop and yield signs have different corresponding behavior by the autonomous vehicle. With respect to the speed limit of outgoing lanes (e.g., 25 mph, 30 mph, 35 mph, 45 mph), roads with higher speed limits have higher perception range requirements for the autonomous vehicle as the autonomous vehicle must be aware of a greater range relative to its greater speed.

The number of outgoing lanes with the same turn direction will determine the number of lanes for which yielding information will be determined. For example, when turning right into any of the lanes of a multi-lane road, the lane closest to the curb will only need to yield to traffic in the destination lane, but turning right into the lane farthest from the curb will require yielding to all lanes of traffic traveling in that direction since the autonomous vehicle must cross all lanes.

Different cities, regions, and areas have different road topology characteristics including, for example, road widths, curbs, crosswalks, bike lanes, parking areas, etc. These topology characteristics will factor into movement parameters for the autonomous vehicle. For example, a turn radius will be larger in a region where lanes are wider and/or a stopping location may be determined based, at least in part, on a crosswalk width. These road topology characteristics are a few examples, of many road topology characteristics that can be considered.

Some locations (e.g., pulling out of a parking lot or parking garage) may have an additional sidewalk crossing to navigate. These can have their own challenges (e.g., occlusions caused by fences or landscape features) that are different than a crosswalk.

In the examples that follow, autonomous vehicles utilizing the techniques and components described herein can perform at least the following at minor-major intersections: 1) right turns at stop signs (e.g., at all-way stops), which can feature crosswalks, pedestrians and/or bicycles traveling in various directions; 2) unprotected left turns across one or more lanes (that may be occluded) with oncoming cars and/or bicycles with the right-of-way; and 3) lane changes where the autonomous vehicle pulls in front of another vehicle (e.g., human-operated vehicle, another autonomous vehicle) that has the right-of-way.

Figure 1:
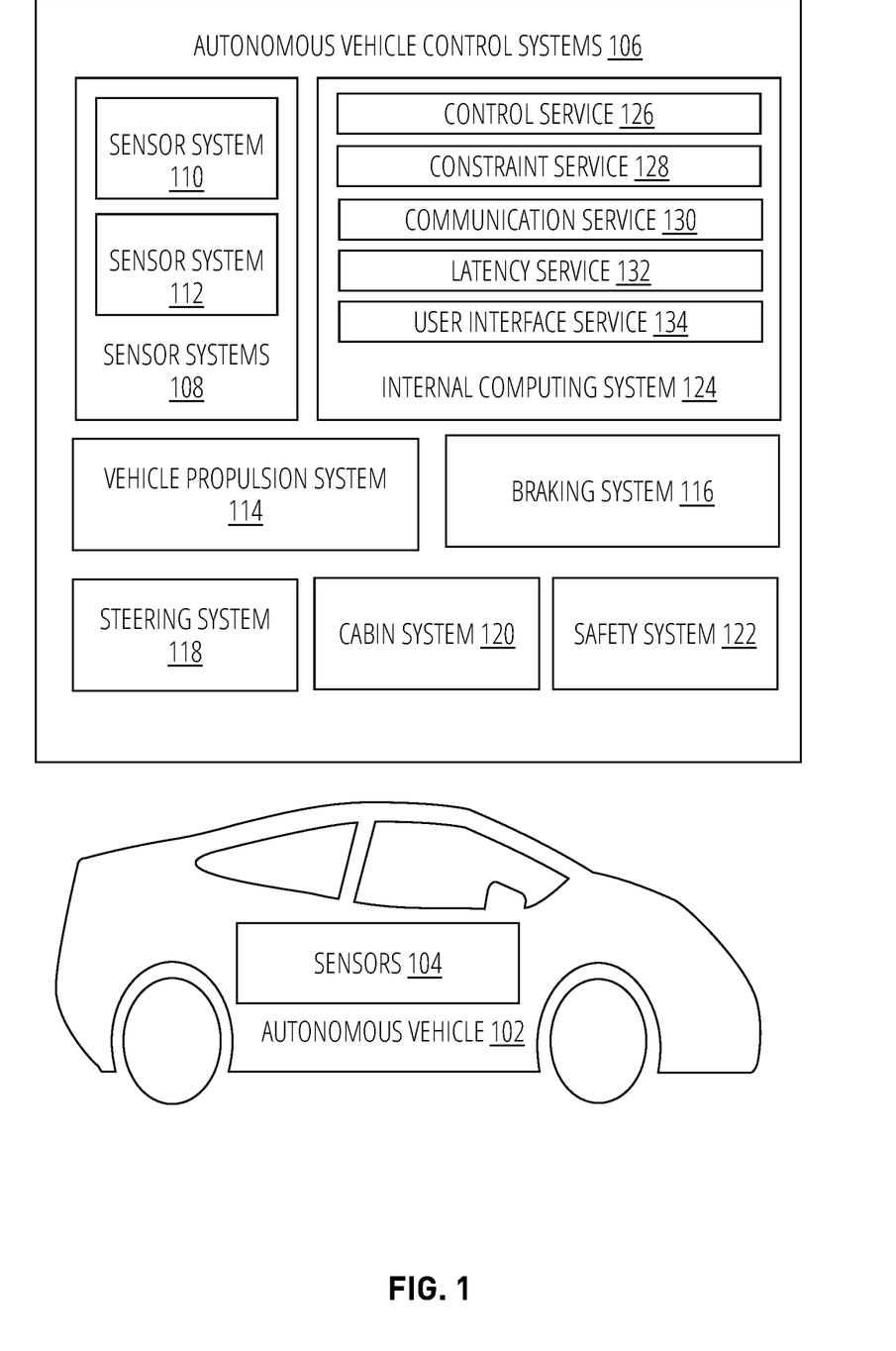
FIG. 1 is a block diagram of an example autonomous vehicle.

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Autonomous vehicle 102 can further include mechanical systems to control and manage motion of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. Safety system 122 can include one or more radar systems. Autonomous vehicle 102 can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems can operate in the 77 GHz band (e.g., 76-81 GHz). SRR systems can be used, for example, for blind spot detection or collision avoidance. SRR systems can operate in the 24 GHz band. MRR systems can operate in either the 24 GHz band or the 77 GHz band. Other frequency bands can also be supported.

Autonomous vehicle 102 can further include internal computing system 124 that can interact with sensor systems 108 as well as the mechanical systems (e.g., vehicle propulsion system 114, braking system 116, steering system 118, cabin system 120 and safety system 122). Internal computing system 124 includes at least one processor and at least one memory system that can store executable instructions to be executed by the processor. Internal computing system 124 can include any number of computing subsystems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132 and internal computing system 124) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132 and user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system or a human operator, software updates, rideshare information (e.g., pickup and/or dropoff requests and/or locations), etc.

In various examples, internal computing system 124 can use one or more sensor systems 108 (e.g., sensor system 110, sensor system 112) to control the operation of autonomous vehicle 102 as it performs a maneuver through a minor-major intersection. Various examples of potential maneuvers and corresponding characteristics and controls are described in greater detail below.

In some examples described herein, autonomous vehicle 102 (or another device) may be described as collecting data corresponding to surrounding vehicles. This data may be collected without associated identifiable information from these surrounding vehicles (e.g., without license plate numbers, make, model, and the color of the surrounding vehicles). Accordingly, the techniques mentioned here can because for the beneficial purposes described, but without the need to store potentially sensitive information of the surrounding vehicles.

Figure 2:
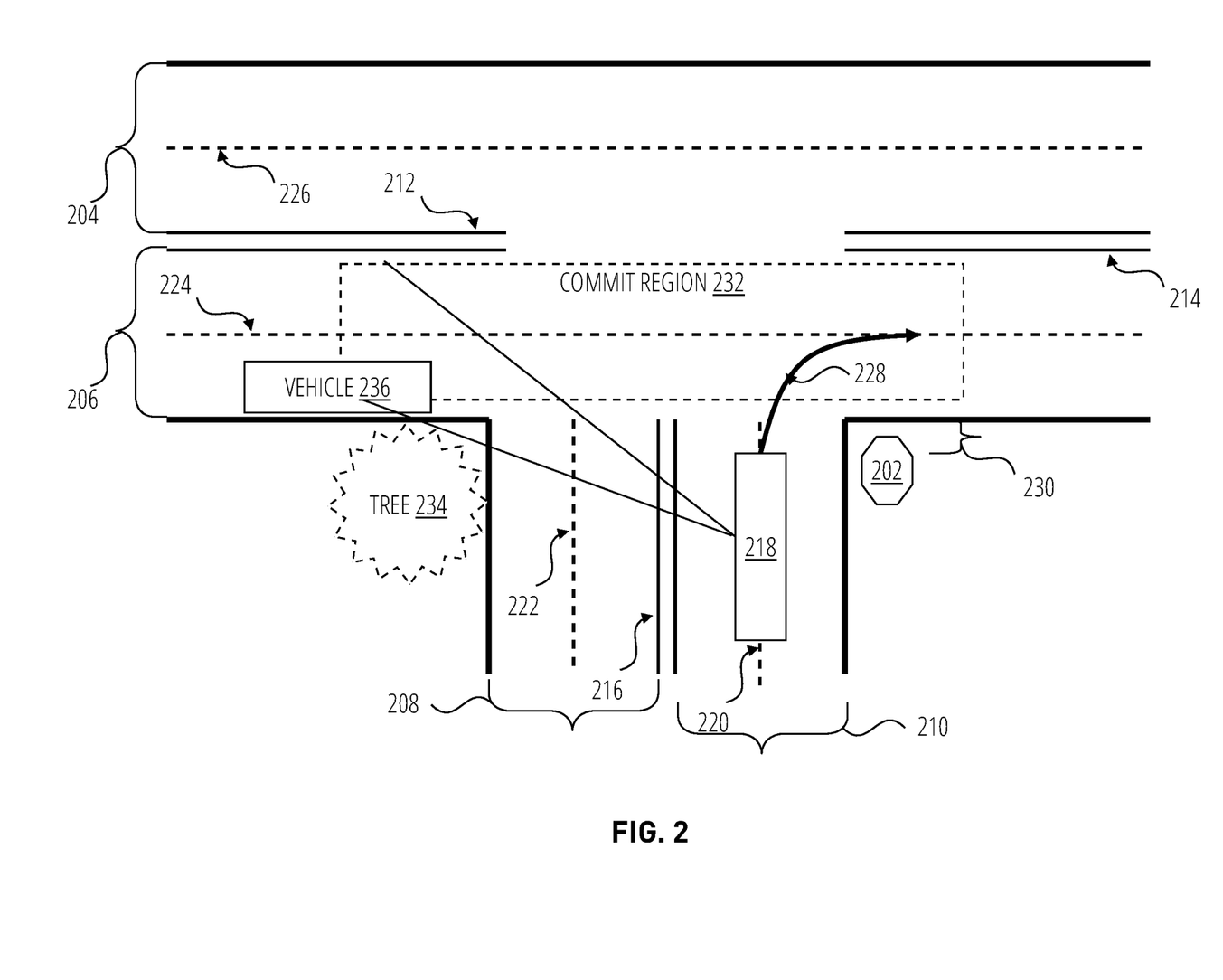
FIG. 2 is an example of a minor-major intersection with an autonomous vehicle that can be configured to perform one or more maneuvers within the minor-major intersection where the autonomous vehicle performs a right turn.

FIG. 2 is an example of a minor-major intersection with an autonomous vehicle that can be configured to perform one or more maneuvers within the minor-major intersection where the autonomous vehicle performs a right turn. As discussed above, a minor-major intersection is an intersection where a vehicle (e.g., an autonomous vehicle) entrance into an intersection is controlled by a stop sign or by a yield sign, and the cross-traffic lanes do not stop (e.g., do not have a traffic control sign, signal, or other indication that requires a stop before being allowed to proceed). Thus, the example of FIG. 2 is one of many possible minor-major intersection configurations. The example of FIG. 2 is a minor-major intersection where the minor lane is controlled by stop sign 202. In similar examples, the minor-major intersection have a minor lane that is controlled by a yield sign (not illustrated in FIG. 2) that could operate in a similar manner with relaxed restrictions on positioning before entering the minor-major intersection.

In the example minor-major intersection of FIG. 2, major lanes 204 and 206, and minor lanes 208 and 210 intersect where minor lane 210 is controlled by stop sign 202. Road divider lines 212 and 214 divide major lanes 204 and 206, and road divider line 216 divides minor lanes 208 and 210. Road divider lines can be, for example, double solid yellow lines, single dashed yellow lines, double yellow lines with one solid and one dashed, etc. Various jurisdictions utilize different groupings of road divider lines.

In some examples, for operation of autonomous vehicle 218 (which can be analogous to autonomous vehicle 102, or some other autonomous vehicle configuration), lane centerlines 220, 222, 224 and 226 can be conceptually mapped onto the physical road lanes to assist in navigating autonomous vehicle 218 through the illustrated intersection.

In the example of FIG. 2, autonomous vehicle 218 identifies stop sign 202 as an indication to stop prior to entering the intersection. Thus, autonomous vehicle 218 comes to a complete stop before proceeding with right turn 228. In some examples, autonomous vehicle 218 can have a map accessible by an internal control system (e.g., internal computing system 124), and the map data can include metadata about various traffic patterns. For example, the map data can provide an indication whether a selected intersection is a minor-major intersection. Additional metadata can also be included in the map data. In other examples, the sensors (e.g., sensor systems 108) and control system (e.g., internal computing system 124) can independently determine if an intersection is a minor-major intersection by, for example, through use of various scanning and analysis techniques.

After stopping for stop sign 202, autonomous vehicle 218 positions itself, using sensors and control systems, for example, in region 230 between stop sign 202 and the boundary of major lane 206 to gain visibility. As described in greater detail below, commit regions and/or shadow tracks can be utilized to control autonomous vehicle 218 such that it will only encroach onto major lane 206 when it is ready to fully complete the designated maneuver (e.g., right turn 228). Part of the evaluation process can include determining various factors including, for example, collision costs, induced kinematic discomfort and/or post encroachment time. These and other factors are described in greater detail below, for example, with respect to FIG. 4.

In general, kinematics is the geometry of motion and the various related characteristics include, for example, acceleration/deceleration, velocity, position, relative motion, etc. Induced kinematic discomfort refers to discomfort caused by a host vehicle (e.g., autonomous vehicle 218) on another road user as a result of the other road user changing a kinematic characteristic in response to an action taken by the host vehicle. For example, if the host vehicle makes a right turn and causes another road user to use their braking system to decelerate in response to the right turn, the kinematic changes that result are the induced kinematic discomfort of the right turn. As discussed in greater detail below, the induced kinematic discomfort can be treated as a cost in an evaluation of available trajectories or paths that the host vehicle may take. Some induced kinematic discomfort may be acceptable, while induced kinematic discomfort over some threshold amount may be considered excessive and unacceptable.

Post-encroachment time refers to an evaluation of trajectories for two or more vehicles, where those trajectories intersect and how much of a time gap is allowed between trajectory intersections. Thus, post-encroachment time is generally how much travel time (e.g., following distance) will result after the host vehicle (e.g., autonomous vehicle 218) executes the desired maneuver. For example, if the host vehicle makes a right turn, how much following distance (in terms of a time gap) is allowed to another road user following the host vehicle after the right turn.

In general, autonomous vehicle 218 should not stop while encroaching on the major lanes (e.g., 204, 206) unless autonomous vehicle 218 is owning the lane. In other words, autonomous vehicle 218 should not be in the way of traffic with right-of-way. In an example, one or more commit regions (e.g., commit region 232) can be used whenever a maneuver from a minor lane intersects a yield-to lane. A yield-to lane is one in which vehicles in the yield-to lane have right-of-way with respect to the autonomous vehicle in a minor lane.

Figure 3:
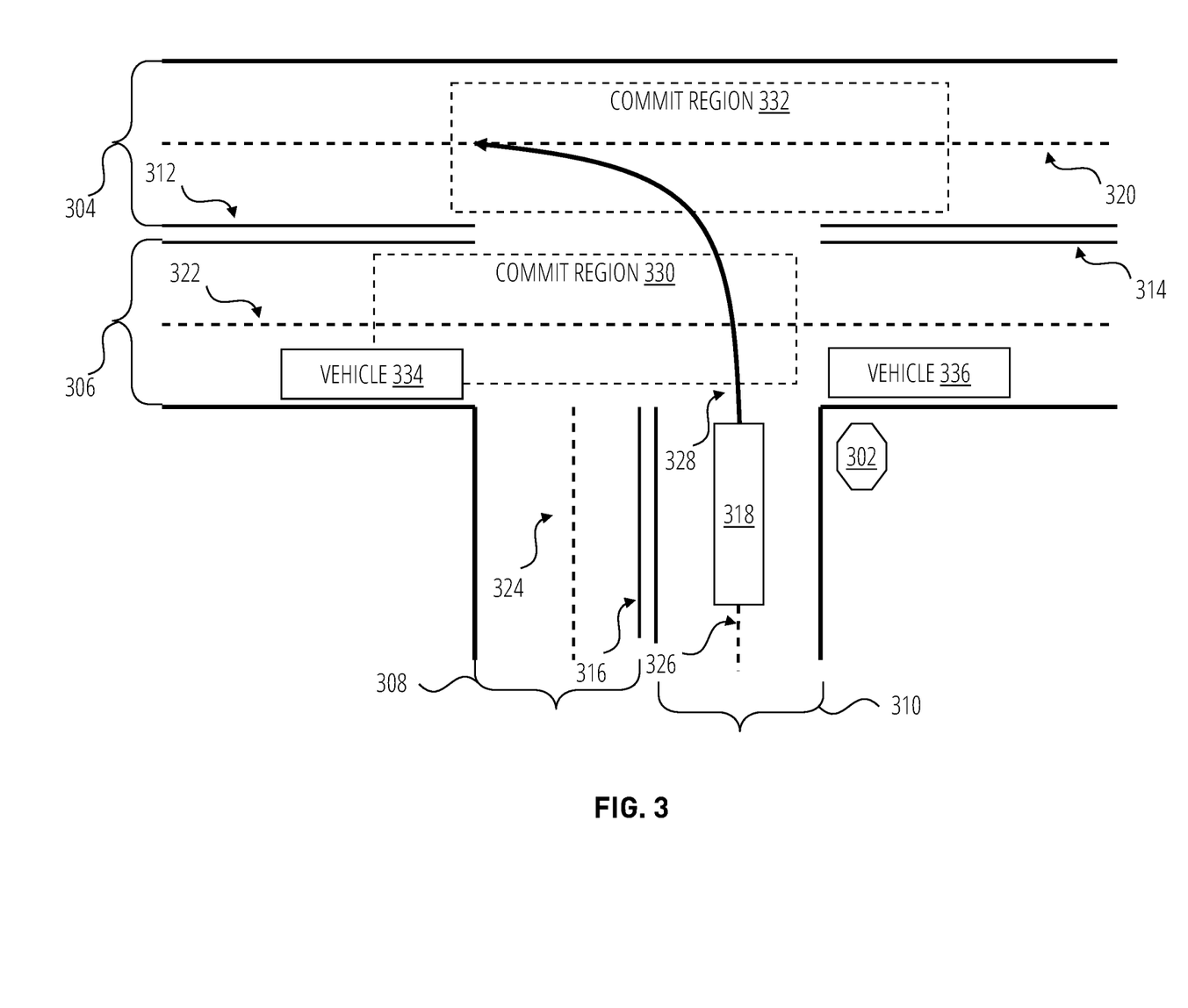
FIG. 3 is an example of a minor-major intersection with an autonomous vehicle that can be configured to perform one or more maneuvers within the minor-major intersection where the autonomous vehicle performs a left turn.

A simple right turn, as illustrated in FIG. 2, utilizes a single commit region. More complicated maneuvers, for example, a left turn from a minor lane to a major lane of a 2-lane road as illustrated in FIG. 3, could utilize two commit regions. A commit region generally refers to a region of a road that an autonomous vehicle will not enter if the autonomous vehicle has not (pervious to entry into the commit region) determined that it can safely traverse the commit region once it enters the commit region.

Intersection maneuvers in more complex intersections, for example, driving straight through an intersection with a 4-lane major road could utilize four or more commit regions. Thus, in the example, of FIG. 2 assuming no occlusions, autonomous vehicle 218 can execute right turn 228 to lane 206 when commit region 232 is clear. However, when one or more occlusions exist (e.g., tree 234), autonomous vehicle 218 cannot reliably determine whether commit region 232 can be cleared without further analysis. Because the intersection situation is dynamic, occlusions may come and go, and In an example, shadow tracks can be utilized to represent risk from occlusions. Occlusions can result in vehicles that are not clearly identified with the sensors of autonomous vehicle 218. These vehicles can include, for example, other autonomous vehicles, human-operated vehicles, bicycles, etc. Conceptually, shadow tracks are track (or path) representations of what could (not necessarily will) emerge from an obscured region caused by an intersection occlusion. Occlusions can be caused by, for example, parked or moving vehicles (e.g., vehicle 236), trees (e.g., tree 234), fences, poor lighting, foggy conditions, etc.

In an example, shadow tracks are used as inputs to a prediction mechanism or routing mechanism and can be treated as real vehicles for prediction purposes. In some examples, shadow tracks are only created for specific maneuvers, for example, those involving minor-major intersections.

In the example illustrated in FIG. 2, tree 234 and/or vehicle 236 can be occlusions that partially obstruct a portion of commit region 232 for autonomous vehicle 218. As a result, autonomous vehicle 218 may not be able to fully process intersection conditions within a desired range of safety without additional information. In this situation, shadow tracks can be generated to compensate for the occlusions by representing virtual road users (e.g., other vehicles, bicycles) that could exist, but are not detected by the sensors of autonomous vehicle 218. In some examples, the shadow tracks have an associated weight or probability that generally corresponds with the likelihood of their existence.

Information gathered with sensors of autonomous vehicle 218, the generated shadow tracks and/or other information can be provided to one or more modeling tools that can perform various analytical operations to determine whether autonomous vehicle 218 should execute right turn 228 or wait for conditions to change. Examples of the analytical operations, evaluations, decisions and/or resulting functions are described in greater detail below.

FIG. 3 is an example of a minor-major intersection with an autonomous vehicle that can be configured to perform one or more maneuvers within the minor-major intersection where the autonomous vehicle performs a left turn. The example of FIG. 3 is one of many possible minor-major intersection configurations. The example of FIG. 3 is a minor-major intersection where the minor lane is controlled by stop sign 302. In similar examples, the minor-major intersection have a minor lane that is controlled by a yield sign (not illustrated in FIG. 3) that could operate in a similar manner with relaxed restrictions on positioning before entering the minor-major intersection.

In the example minor-major intersection of FIG. 3, major lanes 304 and 306, and minor lanes 308 and 310. Road divider lines 312 and 314 divide major lanes 304 and 306, and road divider line 316 divides minor lanes 308 and 310. Road divider lines can be, for example, double solid yellow lines, single dashed yellow lines, double yellow lines with one solid and one dashed, etc. Various jurisdictions utilized different groupings of road divider lines.

In some examples, for operation of autonomous vehicle 318 (which can be analogous to autonomous vehicle 102, or some other autonomous vehicle configuration), lane centerlines 320, 322, 324, and 326 can be conceptually mapped onto the physical road lanes to assist in navigating autonomous vehicle 318 through the illustrated intersection.

In the example of FIG. 3, autonomous vehicle 318 identifies stop sign 302 as an indication to stop prior to entering the intersection. Thus, autonomous vehicle 318 comes to a complete stop before proceeding with left turn 328. In some examples, autonomous vehicle 318 can have a map accessible by an internal control system (e.g., internal computing system 124), and the map data can include metadata about various traffic patterns. For example, the map data can provide an indication whether a selected intersection is a minor-major intersection. Additional metadata can also be included in the map data. In other examples, the sensors (e.g., sensor systems 108) and control system (e.g., internal computing system 124) can independently determine if an intersection is a minor-major intersection by, for example, through use of various scanning and analysis techniques.

Left turn 328 as illustrated in FIG. 3 can involve two commit regions (e.g., commit region 330, commit region 332), both of which should be clear before autonomous vehicle 318 executes left turn 328. In the example of FIG. 3, vehicle 334 obstructs commit region 330 and vehicle 336 obstructs commit region 332. To navigate the intersection with these occlusions, control systems of autonomous vehicle 318 can utilize shadow tracks and/or other control functionality. In the left turn scenario, shadow tracks and/or other factors can be applied to both commit region 330 and commit region 332.

Figure 4:
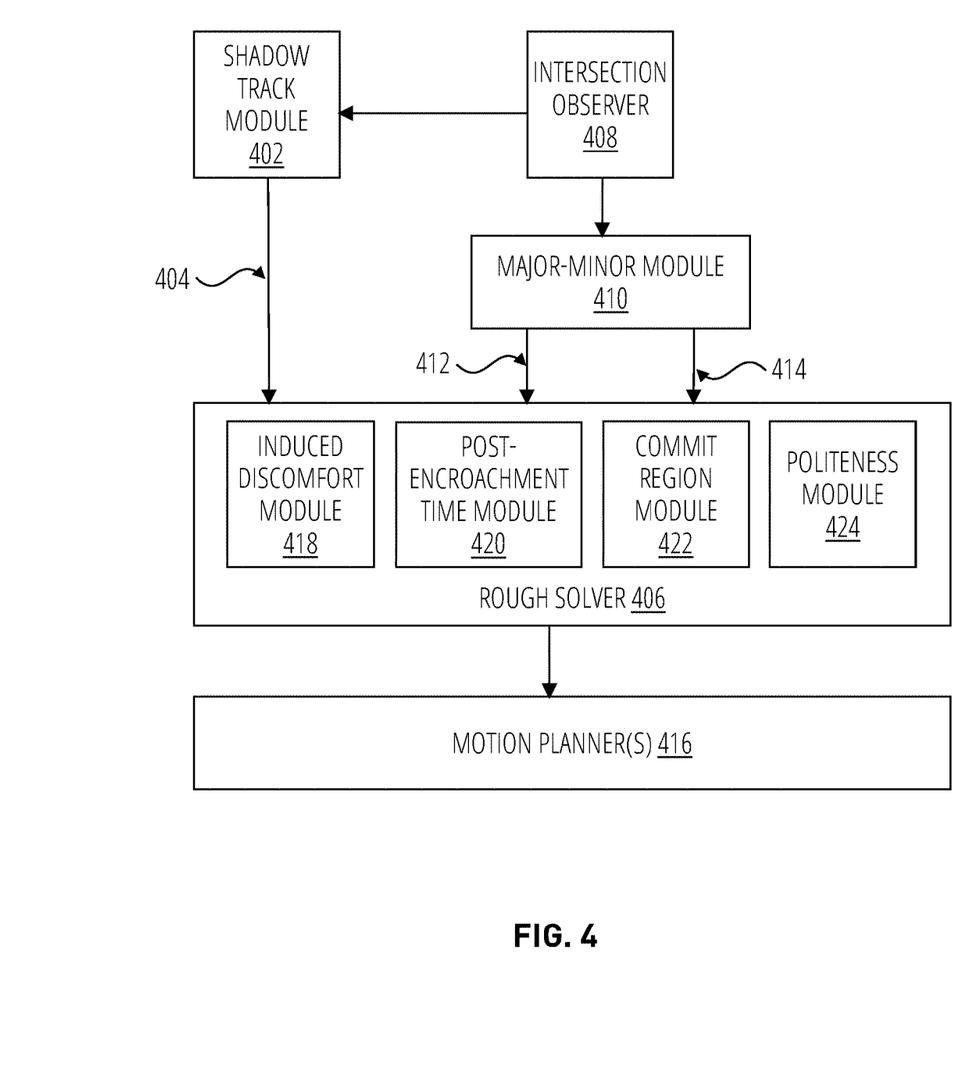
FIG. 4 is a block diagram of an example architecture for navigating an autonomous vehicle through a minor-major intersection.

FIG. 4 is a block diagram of an example architecture for navigating an autonomous vehicle through a minor-major intersection. The components of FIG. 4 can reside within a control system of an autonomous vehicle (e.g., internal computing system 124 of autonomous vehicle 102 as illustrated in FIG. 1). the various elements of FIG. 4 can be hardware, software, firmware, or a combination thereof.

Shadow track module 402 can generate shadow tracks 404 to be provided as inputs to rough solver 406. In some examples, shadow track module 402 only provides shadow tracks 404 for navigating minor-major intersections. Shadow track module 402 can have access to map data (not illustrated in FIG. 4) indicating whether a particular intersection is a minor-major intersection, which can cause shadow track module 402 to generate shadow tracks 404.

In an example, when the host autonomous vehicle approaches a minor-major intersection, intersection observer 408 can provide intersection information to shadow track module 402. For example, intersection observer 408 can identify an intersection as a minor-major intersection and provide that (and possibly other) information to shadow track module 402 and to major-minor module 410. Intersection observer 408 can gather information from various sources including, for example, map data, sensor data, etc.

In an example, major-minor module 410 responds to an indication of approaching a minor-major intersection from intersection observer 408 by generating commit regions 412 and stop point 414. Stop point 414 information can be utilized to determine where the host autonomous vehicle should stop for the intersection. Stop point 414 refers to the point at which the autonomous vehicle stops in response to identifying a stop sign, red light, etc. Similarly, if the intersection is controlled by a yield sign, navigation of the intersection can be modified appropriately. Commit regions 412 can be utilized as described with respect to FIG. 2 and FIG. 3 above.

Rough solver 406 can receive shadow tracks 404, commit regions 412 and stop point 414 to generate rough (approximate) paths for the host autonomous vehicle. One or more rough paths from rough solver 406 can be provided to motion planner(s) 416 for refinement and final path determination.

Rough solver 406 can include various modules that perform various types of analysis that can be applicable to navigating a minor-major intersection. In the example of FIG. 4, rough solver 406 includes induced discomfort module 418, post-encroachment time module 420, commit region module 422 and politeness module 424.

In an example, rough solver 406 can include logic for lateral and longitudinal planning for the host autonomous vehicle. Decisions made by rough solver 406 can be informed by ordinal costs, which can include induced kinematic discomfort (e.g., as determined by induced discomfort module 418) and vehicle post encroachment time considerations (e.g., as determined by post-encroachment time module 420), as primary considerations. Rough solver 406 can also utilize commit region module 422 to determine if a commit region is clear and/or if the commit region is obstructed, which can determine how shadow tracks 404 are utilized by rough solver 406. Politeness module 424 can provide reactions/modifications in response to monitored behaviors of other road users (e.g., to cause the host autonomous vehicle to behave in a more human-like manner).

Induced discomfort module 418 can determine a cost corresponding to induced kinematic discomfort when performing an unprotected maneuver in the presence of other road users with the right-of-way. The cost associated with the induced kinematic discomfort can be used in the evaluation process in determining how to navigate the intersection.

In an example, the induced kinematic discomfort cost can be determined for each road user in the intersection (except the host autonomous vehicle) at various intervals, including the actual cost (which is the difference in the road user deceleration caused by the host autonomous vehicle trajectory) and a multiplier that can be adjusted for different right-of-way situations. The multiplier can be used to, for example, discount the cost in situations where the other road user is behind the host autonomous vehicle.

In some examples, the induced kinematic discomfort cost can be modulated by, for example, politeness module 424 in response to a determination (e.g., via sensors of the host autonomous vehicle) that another road user is yielding the right-of-way to the host autonomous vehicle. When merging into traffic, the host autonomous vehicle is generally expected to accelerate and smoothly enter the stream of traffic-induced kinematic discomfort evaluations and/or post-encroachment time evaluations can be used to determine whether the host autonomous vehicle would allow sufficient following distance for a road user behind the autonomous vehicle after navigating the minor-major intersection.

Post-encroachment time module 420 can determine a cost corresponding to proposed trajectories for the host autonomous vehicle and the physical space and/or time gap allowed between the host autonomous vehicle as it follows the proposed trajectories and other road users. In some examples, the post-encroachment time cost can be modulated by, for example, politeness module 424 in response to a determination (e.g., via sensors of the host autonomous vehicle) that another road user is indicting an intention to yield the right-of-way to, or slow to allow more room for, the host autonomous vehicle.

Commit region module 422 can evaluate the one or more commit regions in an intersection. When no occlusions exist, commit region module 422 can determine when the commit regions are clear and provide an indication to rough solver 406 when the intersection is (or will be) clear for the host autonomous vehicle to perform the desired maneuver in the intersection. When occlusions exist, commit region module 422 can utilize shadow tracks 404 to determine probabilities and/or costs associated with possible road users within or approaching the commit regions. As costs associated with shadow tracks 404 increase (e.g., in response to an increased number of potential road users) the overall costs of the maneuver can increase, which can decrease the likelihood that the host autonomous vehicle will attempt the desired maneuver.

In an example, one or more proposed rough trajectories and associated costs as determined by rough solver 406 can be provided to motion planner(s) 416 for further refinement and final trajectory selection. Motion planner(s) 416 can perform further analysis and provide the final trajectory information to one or more control systems (not illustrated in FIG. 4) for execution.

Figure 5:
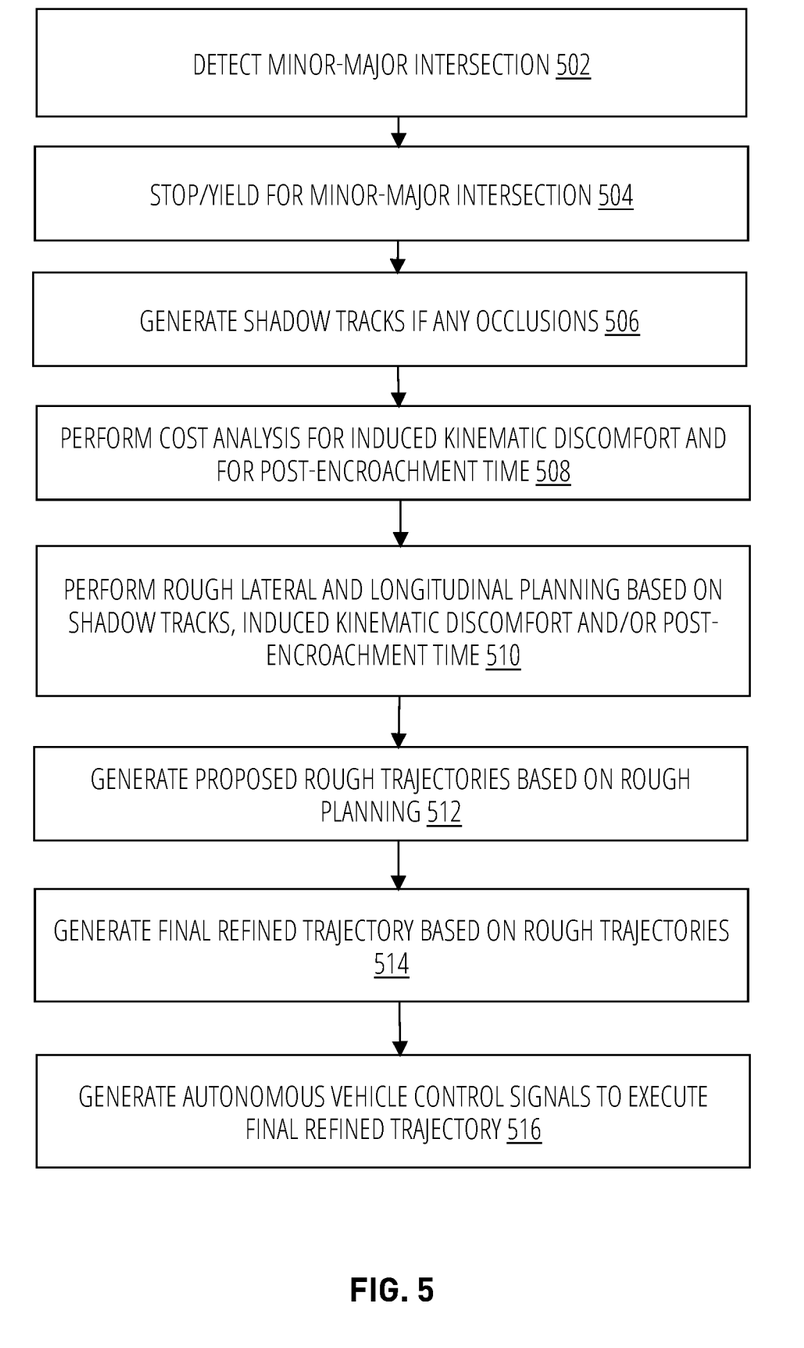
FIG. 5 is a flow diagram for one technique for navigating an autonomous vehicle through a minor-major intersection.

FIG. 5 is a flow diagram for one technique for navigating an autonomous vehicle through a minor-major intersection. The navigation techniques as described with respect to FIG. 5 can be performed by, for example, autonomous vehicle 102 utilizing one or more of sensors 104 and autonomous vehicle control systems 106.

A minor-major intersection is detected, 502. In some examples, an autonomous vehicle can have a map accessible by an internal control system that include metadata about various traffic patterns. For example, the map data can provide an indication whether a selected intersection is a minor-major intersection. Additional metadata can also be included in the map data. In other examples, the sensors and control system of the autonomous vehicle can determine if an intersection is a minor-major intersection by, for example, through use of various scanning and analysis techniques.

The autonomous vehicle stops (or yields, depending on the intersection) for the minor-major intersection, 504. In response to detecting the minor-major intersection and any traffic control signs for the intersection, the autonomous vehicle can be stopped at the appropriate location that is consistent with local traffic laws. In some situations, the autonomous vehicle may stop and then creep forward to provide improved intersection visibility.

Shadow tracks can be generated if there are any intersection occlusions, 506. As discussed above, shadow tracks are track (or path) representations of what could (not necessarily will) emerge from an obscured region caused by an intersection occlusion. Shadow tracks can be generated by, for example, a shadow tracks module (e.g., shadow track module 402) or other computational component that can provide probabilities associated with potential road users. Occlusions can be caused by, for example, parked or moving vehicles, trees or other landscape features, signs, fences, poor lighting, foggy conditions, etc.

A cost-based analysis can be performed for induced kinematic discomfort and/or for post-encroachment time, 508. This cost-based analysis is generally based on the actions, reactions and/or positions of other road users and how actions by the autonomous vehicle impacts the overall operating environment. In some examples, induced kinematic discomfort and/or post-encroachment time analysis can be modulated based on detected real-time actions of other road users. This functionality can be provided by, for example, politeness module 424 or a similar component.

A rough planning based on lateral and longitudinal movements can be performed based on shadow tracks, induced kinematic discomfort and/or post-encroachment time, 510. The rough planning provides a course trajectory analysis and can result in multiple rough trajectories, 512. In an example, the rough planning is performed by a first-level solver (e.g., rough solver 406) that can perform cost-based analyses of various potential trajectories to identify/generate a subset of potential trajectories that can be further evaluated and used to determine a final refined trajectory, 514.

As costs associated with shadow tracks 404 increase (e.g., in response to an increased number of potential road users) the overall costs of the maneuver can increase, which can decrease the likelihood that the host autonomous vehicle will attempt the desired maneuver. In an example, the induced kinematic discomfort cost can be determined for each road user in the intersection (except the host autonomous vehicle) at various intervals, including the actual cost (which is the difference in the road user deceleration caused by the host autonomous vehicle trajectory) and a multiplier that can be adjusted for different right-of-way situations. The multiplier can be used to, for example, discount the cost in situations where the other road user is behind the host autonomous vehicle.

In an example, the rough trajectories are provided to a second-level solver that can provide a more sophisticated analysis than the first-level solver. The resulting final refined trajectory can include more detailed control data and/or more degrees of freedom as compared to the rough trajectories that were previously generated. The final refined trajectory can be utilized to generate control signals for various components of the autonomous vehicle, which can be executed to cause the autonomous vehicle to perform the selected maneuver(s) to navigate the minor-major intersection, 516.

Figure 6:
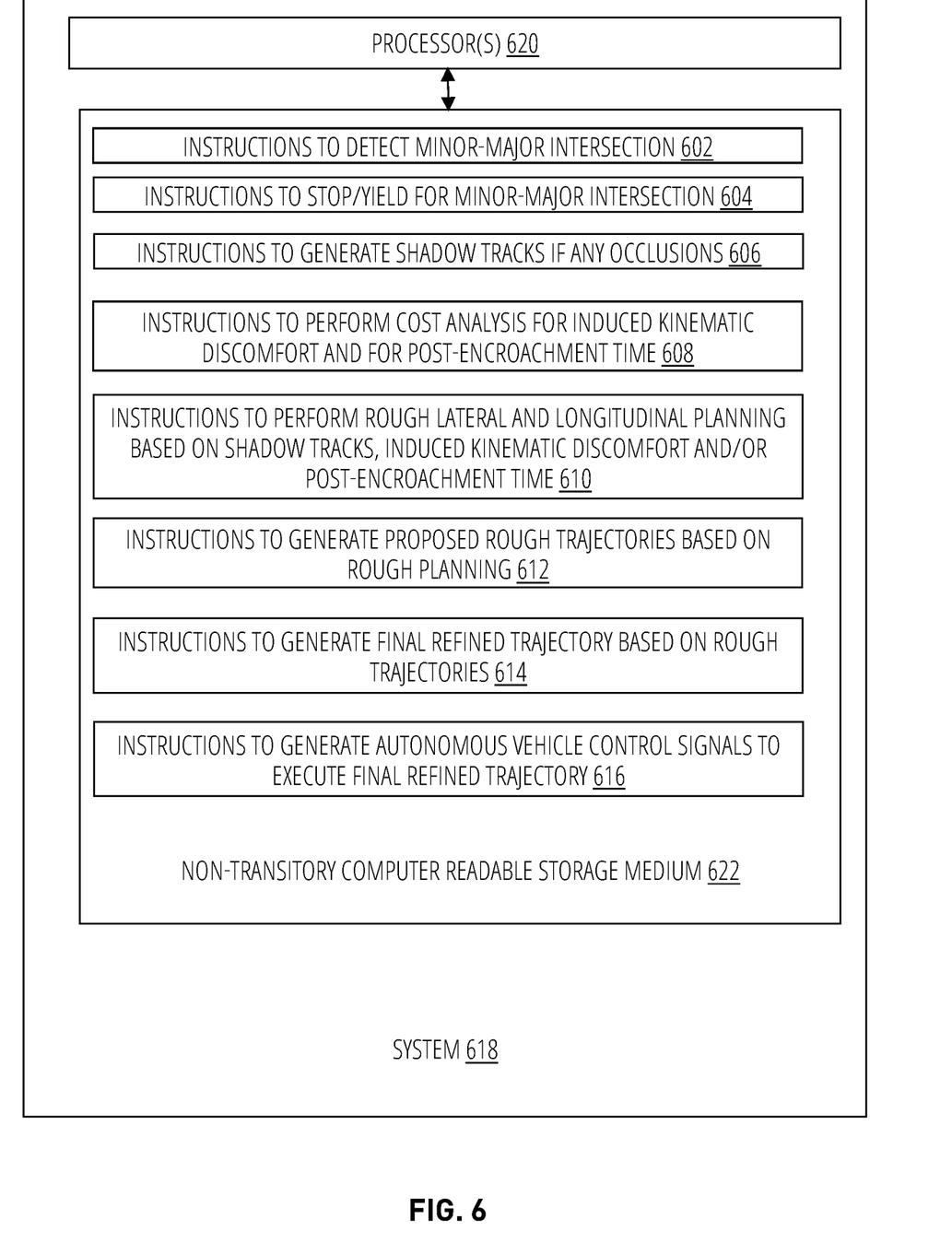
FIG. 6 a block diagram of one example of a processing system that can provide control of an autonomous vehicle to navigate through a minor-major intersection.

FIG. 6 is a block diagram of one example of a processing system that can provide control of an autonomous vehicle to navigate through a minor-major intersection. In one example, system 618 can be part of an autonomous vehicle (e.g., autonomous vehicle 102 as part of internal computing system 124) that utilizes various sensors including radar sensors.

In an example, system 618 can include processor(s) 620 and non-transitory computer readable storage medium 622. Non-transitory computer readable storage medium 622 may store instructions 602, 604, 606, 608, 610, 612, 614 and 616 that, when executed by processor(s) 620, cause processor(s) 620 to perform various functions. Examples of processor(s) 620 may include a microcontroller, a microprocessor, a central processing unit (CPU), a graphics processing unit (GPU), a data processing unit (DPU), an application-specific integrated circuit (ASIC), an field programmable gate array (FPGA), a system on a chip (SoC), etc. Examples of a non-transitory computer readable storage medium 622 include tangible media such as random access memory (RAM), read-only memory (ROM), electrically erasable programmable read-only memory (EEPROM), flash memory, a hard disk drive, etc.

Instructions 602 cause processor(s) 620 to detect a minor-major intersection. In some examples, an autonomous vehicle can have a map accessible by an internal control system that include metadata about various traffic patterns, which can provide an indication whether a selected intersection is a minor-major intersection. In other examples, the sensors and control system of the autonomous vehicle can determine if an intersection is a minor-major intersection by, for example, through use of various scanning and analysis techniques.

Instructions 604 cause processor(s) 620 to stop (or yield, depending on the intersection) for the minor-major intersection. In response to detecting the minor-major intersection and traffic control signs for the intersection, the autonomous vehicle can be stopped at the appropriate location that is consistent with local traffic laws. In some situations, the autonomous vehicle may stop and then creep forward to provide improved intersection visibility.

Instructions 606 cause processor(s) 620 to generate shadow tracks if appropriate for the intersection conditions to approximate/estimate what could (not necessarily will) emerge from an obscured region caused by an intersection occlusion. The shadow tracks can be generated by a shadow track module and/or by other system components.

Instructions 608 cause processor(s) 620 to perform a cost-based analysis for induced kinematic discomfort and/or for post-encroachment time. As discussed above, this cost-based analysis is generally based on the actions, reactions and/or positions of other road users and how actions by the autonomous vehicle impacts other road users in the operating environment. In some examples, induced kinematic discomfort and/or post-encroachment time analysis can be modulated based on detected real-time actions of other road users.

Instructions 610 cause processor(s) 620 to perform rough trajectory planning based on lateral and longitudinal movements can be performed based on shadow tracks, induced kinematic discomfort and/or post-encroachment time. The rough planning provides a course trajectory analysis and can result in multiple rough trajectories.

Instructions 612 cause processor(s) 620 to provide the rough trajectory planning to generate a course trajectory analysis and can result in multiple rough trajectories. In an example, the rough planning is performed by a first-level solver (e.g., rough solver 406) that can perform cost-based analyses of various potential trajectories.

Instructions 614 cause processor(s) 620 to perform rough planning a first-level solver that can perform cost-based analyses of various potential trajectories to identify/generate a subset of potential trajectories that can be further evaluated and used to determine a final refined trajectory. In an example, the induced kinematic discomfort cost can be determined for each road user in the intersection (except the host autonomous vehicle) at various intervals, including the actual cost (which is the difference in the road user deceleration caused by the host autonomous vehicle trajectory) and a multiplier that can be adjusted for different right-of-way situations. The multiplier can be used to, for example, discount the cost in situations where the other road user is behind the host autonomous vehicle.

The rough trajectories can be provided to a second-level solver that can provide a more sophisticated analysis than the first-level solver. The resulting final refined trajectory can include more detailed control data and/or more degrees of freedom as compared to the rough trajectories that were previously generated. The final refined trajectory can be utilized to generate control signals for various components of the autonomous vehicle, which can be executed to cause the autonomous vehicle to perform the selected maneuver(s) to navigate the minor-major intersection.

Instructions 616 cause processor(s) 620 to generate control signals for various components of the autonomous vehicle based on the final refined trajectory to cause the autonomous vehicle to perform the selected maneuver(s) to navigate the minor-major intersection.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 622 has stored thereon data representing sequences of instructions that, when executed by a processor(s) 620, cause the processor(s) 620 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A non-transitory computer-readable medium having stored thereon instructions that, when executed by one or more processors, cause the one or more processors to:
   detect a minor-major intersection in which a first set of lanes, that are controlled by a traffic control mechanism, intersect with a second set of lanes that do not have a traffic control mechanism and an autonomous vehicle is located within the first set of lanes;
   select, in response to detecting a minor major intersection, a set of commit regions in the second set of lanes, wherein the set of commit regions are separate regions in the second set of lanes that the autonomous vehicle will not enter unless the corresponding region is clear;
   generate shadow tracks for occlusions associated with the minor-major intersection in the set of commit regions;
   perform maneuver evaluation based on one or more of induced kinematic discomfort and post-encroachment time;
   perform preliminary lateral and longitudinal planning based on the shadow tracks, the induced kinematic discomfort and the post-encroachment time to generate one or more proposed trajectories; and
   cause an autonomous vehicle to perform a selected maneuver within the minor-major intersection corresponding to the one or more proposed trajectories.

2. The non-transitory computer-readable medium of claim 1 further comprising instructions that, when executed by the one or more processors, cause the one or more processors to perform final trajectory generation by refining at least one of the one or more proposed trajectories to generate a final trajectory.

3. The non-transitory computer-readable medium of claim 1 wherein the shadow tracks comprise path representations of road users that could emerge from an obscured region caused by an intersection occlusion.

4. The non-transitory computer-readable medium of claim 1 wherein induced kinematic discomfort represents discomfort caused by the autonomous vehicle on another road user as a result of the other road user changing a kinematic characteristic in response to the autonomous vehicle performing the selected maneuver.

5. The non-transitory computer-readable medium of claim 4 wherein induced kinematic discomfort evaluation is selectively modulated in response to real-time detection of a yielding action by the other road user.

6. The non-transitory computer-readable medium of claim 1 wherein post-encroachment time represents an amount of time separating the autonomous vehicle from another road user after the autonomous vehicle performs the selected maneuver.

7. The non-transitory computer-readable medium of claim 1 wherein the minor-major intersection is controlled by a stop sign.

8. An autonomous vehicle comprising:
   one or more sensor systems to detect characteristics of an operating environment;
   a kinematic control system to provide kinematic controls to the autonomous vehicle;
   a vehicle control system coupled with the one or more sensor systems and with the kinematic control system, the vehicle control system to:
      detect a minor-major intersection in which a first set of lanes, that are controlled by a traffic control mechanism, intersect with a second set of lanes that do not have a traffic control mechanism and an autonomous vehicle is located within the first set of lanes;
      select, in response to detecting a minor major intersection, a set of commit regions in the second set of lanes, wherein the set of commit regions are separate regions in the second set of lanes that the autonomous vehicle will not enter unless the corresponding region is clear;
      generate shadow tracks for occlusions associated with the minor-major intersection in the set of commit regions;
      perform maneuver evaluation based on one or more of induced kinematic discomfort and post-encroachment time;
      perform preliminary lateral and longitudinal planning based on the shadow tracks, the induced kinematic discomfort and the post-encroachment time to generate one or more proposed trajectories; and
   cause the autonomous vehicle to perform a selected maneuver within the minor major intersection corresponding to the one or more proposed trajectories.

9. The autonomous vehicle of claim 8 wherein the vehicle control system is further configured to perform final trajectory generation by refining at least one of the one or more proposed trajectories to generate a final trajectory.

10. The autonomous vehicle of claim 8 wherein the shadow tracks comprise path representations of road users that could emerge from an obscured region caused by an intersection occlusion.

11. The autonomous vehicle of claim 8 wherein induced kinematic discomfort represents discomfort caused by the autonomous vehicle on another road user as a result of the other road user changing a kinematic characteristic in response to the autonomous vehicle performing the selected maneuver.

12. The autonomous vehicle of claim 8 wherein post-encroachment time represents an amount of time separating the autonomous vehicle from another road user after the autonomous vehicle performs the selected maneuver.

13. The autonomous vehicle of claim 12, wherein post-encroachment time evaluation is selectively modulated in response to real-time detection of a yielding action by the other road user.

14. The autonomous vehicle of claim 8 wherein the minor-major intersection is controlled by a stop sign.

15. A system comprising:
a memory system; and
one or more hardware processors coupled with the memory system, the one or more hardware processors configured to:
   detect a minor-major intersection in which a first set of lanes, that are controlled by a traffic control mechanism, intersect with a second set of lanes that do not have a traffic control mechanism and an autonomous vehicle is located within the first set of lanes;
   select, in response to detecting a minor major intersection, a set of commit regions in the second set of lanes, wherein the set of commit regions are separate regions in the second set of lanes that the autonomous vehicle will not enter unless the corresponding region is clear;
   generate shadow tracks for occlusions associated with the minor-major intersection in the set of commit regions;
   perform maneuver evaluation based on one or more of induced kinematic discomfort and post-encroachment time;
   perform preliminary lateral and longitudinal planning based on the shadow tracks, the induced kinematic discomfort and the post-encroachment time to generate one or more proposed trajectories; and
   cause an autonomous vehicle to perform a selected maneuver within the minor-major intersection corresponding to the one or more proposed trajectories.

16. The system of claim 15 wherein the one or more processors are further configured to perform final trajectory generation by refining at least one of the one or more proposed trajectories to generate a final trajectory.

17. The system of claim 15 wherein the shadow tracks comprise path representations of road users that could emerge from an obscured region caused by an intersection occlusion.

18. The system of claim 15 wherein induced kinematic discomfort represents discomfort caused by the autonomous vehicle on another road user as a result of the other road user changing a kinematic characteristic in response to the autonomous vehicle performing the selected maneuver.

19. The system of claim 15 wherein post-encroachment time represents an amount of time separating the autonomous vehicle from another road user after the autonomous vehicle performs the selected maneuver.

20. The system of claim 15 wherein the minor-major intersection is controlled by a stop sign.

* * * * *